United States Patent [19]
Miyake et al.

[11] Patent Number: 5,465,485
[45] Date of Patent: Nov. 14, 1995

[54] METHOD FOR PRODUCING DAMPER PULLEY

[75] Inventors: Kazutoshi Miyake; Masato Ueno; Satomi Watanabe; Nobuaki Funahashi; Tomohito Asai; Thoru Isono, all of Nakashima, Japan

[73] Assignee: Toyoda Gosei Co., Ltd., Aichi, Japan

[21] Appl. No.: 346,288

[22] Filed: Nov. 23, 1994

[30] Foreign Application Priority Data

Nov. 24, 1993 [JP] Japan .................................. 5-317303
Apr. 28, 1994 [JP] Japan .................................. 6-114518

[51] Int. Cl.$^6$ ........................................ B21K 1/42
[52] U.S. Cl. ........................ 29/892.11; 474/178; 474/902
[58] Field of Search ........................ 29/892.11, 892.1, 29/892; 474/178, 902

[56] References Cited

U.S. PATENT DOCUMENTS 4,961,254  10/1990  Andra et al. .............................. 29/173

FOREIGN PATENT DOCUMENTS 2618090  1/1989  France .................................. 29/892.1
56-47230  4/1981  Japan .................................. 29/892.11
3114652  11/1991  Japan .

OTHER PUBLICATIONS

Japan Abstract, Torsional Damper 58-152953, Sep. 1983, Akira Matsumoto.
Japan Abstract "Torsional Vibration Damper" 58-88246, May 1983, Akira Matsumoto.

*Primary Examiner*—P. W. Echols
*Attorney, Agent, or Firm*—Cushman Darby & Cushman

[57] ABSTRACT

A method for producing a damper pulley having a boss portion to be press-fitted onto a rotary shaft, an annular main portion extending from the boss portion, a flange portion formed along an outer periphery of the main portion, a ring-shaped damper-mass member located outside the flange portion and a rubber body interposed between the flange portion and the damper-mass member includes the steps of integrally forming the boss portion, the main portion and the flange portion of a metallic plate such that the main portion has a curved section, and has a radial length greater than a straight line distance between the boss portion and the flange portion, placing the rubber body between the flange portion and the damper-mass member, and enlarging the diameter of the flange portion to elongate the main portion having a curved section, thereby the enlarged flange portion presses the rubber body against the damper-mass member.

6 Claims, 8 Drawing Sheets

METHOD FOR PRODUCING DAMPER PULLEY

The priority applications, Japanese Patent Application No. 5-317303, filed in Japan on Nov. 24, 1993 and Japanese Patent Application No. Hei 6-114518, filed in Japan on Apr. 28, 1994 are hereby incorporated into the present specification by this reference.

BACKGROUND OF THE INVENTION

1. Field of the Invention

The present invention relates to a method for producing a damper pulley, and, more particularly, to a method by which a rubber body composing a dynamic damper is easily and firmly fixed, thereby improving the durability thereof.

2. Description of Related Art

A damper pulley generally has a pulley of a circular configuration, a ring-shaped damper-mass member located along an outer periphery of the pulley, and a rubber body press-fitted between the pulley and the damper-mass member. The rubber body and damper-mass member act as a dynamic damper which restrains torsional resonance vibrations of a rotary shaft.

One example of a conventional damper pulley is shown in FIG. 1. As shown, a pulley 10 has a cylindrical boss portion 12 at an axial center thereof, an annular main portion 14 extending radially outwardly from the cylindrical boss portion 12, and a flange portion 16 formed along an outer periphery of the annular main portion 14. The pulley 10 is integrally formed by casting. Outside the pulley 10, a ring-shaped damper-mass member 18 is located. A rubber body 20 of a uniform thickness is bonded to the inner surface of the damper-mass member 18. A cylindrical retainer plate 22 is bonded to the inner surface of the rubber body 20.

The retainer plate 22 is radially enlarged and press-fitted onto the outer surface of the flange portion 16. Due to the radial enlargement of the retainer plate 22, the rubber body 20 is compressed outwardly, whereby shrinkage strain within the rubber body 20 generated upon formation thereof can be eliminated.

The above-described conventional damper pulley is, however, of a significant weight because the pulley 10 formed of cast metal is thick. Thus, the production costs of casting are expensive.

Japanese Utility Model application laid-open No. Hei 3-114652 discloses a damper pulley which is provided to overcome the above-described problems. This damper pulley is produced by bending a metallic plate to provide an annular main portion and a flange portion at an outer periphery of the main portion, bonding a rubber body to both the flange portion and a ring-shaped damper-mass member by vulcanization, and enlarging the diameter of the flange portion radially outwardly to compress the rubber body, thereby eliminating the shrinkage strain within the rubber body.

With this method, the weight of the damper pulley and the production costs are both reduced and the production thereof is facilitated easily. However, these damper pulleys are still not satisfactory. In order to overcome the above-described problems, it is preferable to form the cylindrical boss portion integrally with the annular main portion and the flange portion. However, in the case where the boss portion is formed by deep drawing, the thickness of the main portion and the flange portion integral with the boss portion becomes small. As a result, in such a case, it becomes difficult to enlarge the diameter of the thin flange portion outwardly, and sufficient strength for the pulley cannot be obtained upon enlarging the flange portion.

Furthermore, an open end of the flange can deform with ease, however, a base end thereof, which is connected to the main portion, cannot be easily enlarged outwardly. This causes the rubber body not to be compressed uniformly, and there are cases where the rubber body undesirably falls-off due to the residual shrinkage strain therewithin.

SUMMARY OF THE INVENTION

It is an object of the present invention to provide a method for producing a damper pulley by which an entire portion of a pulley including a cylindrical boss portion is integrally formed, a flange portion is enlarge radially outwardly without lowering the strength of the pulley, and a rubber body is firmly fixed, with shrinkage strain being eliminated.

One method in accordance with the present invention for producing a damper pulley having a centrally positioned boss portion adapted to be press-fitted onto a rotary shaft, an annular main portion extending from the boss portion, a flange portion formed along the outer periphery of the main portion, a ring-shaped damper-mass member located outside the flange portion, and a rubber body interposed between the flange portion and the damper-mass member, includes the steps of integrally forming the boss portion, the main portion and the flange portion of a plate-like material such that the main portion has at least one part of a curved section and a radial length greater than a straight line distance between the boss portion and the flange portion, placing the rubber body between the flange portion and the damper-mass member, and enlarging the diameter of the flange portion outwardly such that the at least one part of the main portion having a curved section deforms and elongates radially outwardly, thereby the enlarged flange portion presses the rubber body against the damper-mass member.

Another method in accordance with the present invention includes the steps of integrally forming the boss portion, the main portion and the flange portion of a plate-like material such that the flange portion has a curved part at a base end connected to a peripheral edge of the main portion and the radial distance between the flange portion and the boss portion is less than that of the radial length of the main portion, placing the rubber body between the flange portion and the damper-mass member, and enlarging the diameter of the flange portion outwardly to elongate the curved part, thereby the enlarged flange portion presses the rubber body against the damper-mass member.

With the methods of the present invention, upon radially enlarging the flange portion, the curved part formed in the main portion or at the base end of the flange portion is elongated. In this step, the thickness of the main portion is not reduced. Therefore, in the case where the cylindrical boss portion is formed by deep drawing so that the thickness of the main portion becomes small, the thickness of the main portion is not reduced further due to the enlargement of the flange portion, and accordingly, the strength of the main portion is prevented from lowering. Furthermore, a large force is not required to enlarge the base end of the flange portion, or the base end of the flange portion is previously made to have a large diameter so that the pulley can be easily deformed, and the formed pulley can be easily enlarged with uniformity.

As described above, the flange portion is enlarged with uniformity so that the rubber body fitted between the flange portion and the damper-mass member is compressed uniformly, and accordingly, the rubber body can be firmly fixed to both the flange portion and the damper-mass member with residual shrinkage strain eliminated.

Other objects, features and characteristics of the present invention will become apparent upon consideration of the following description and the appended claims with reference to the accompanying drawings, all of which form a part of this specification.

DESCRIPTION OF THE PRESENTLY PREFERRED EXEMPLARY EMBODIMENTS

Figure 1:
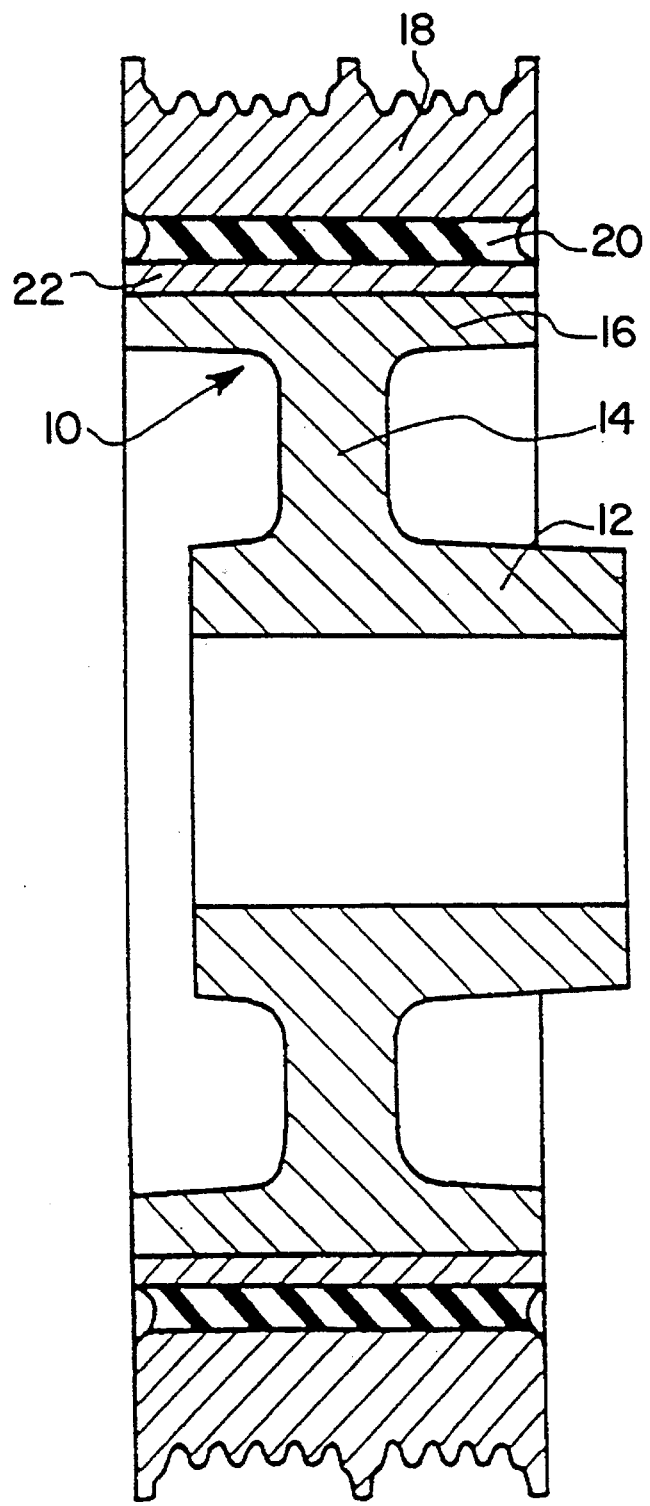
FIG. 1 is a longitudinal sectional view of a conventional damper pulley.
Figure 2:
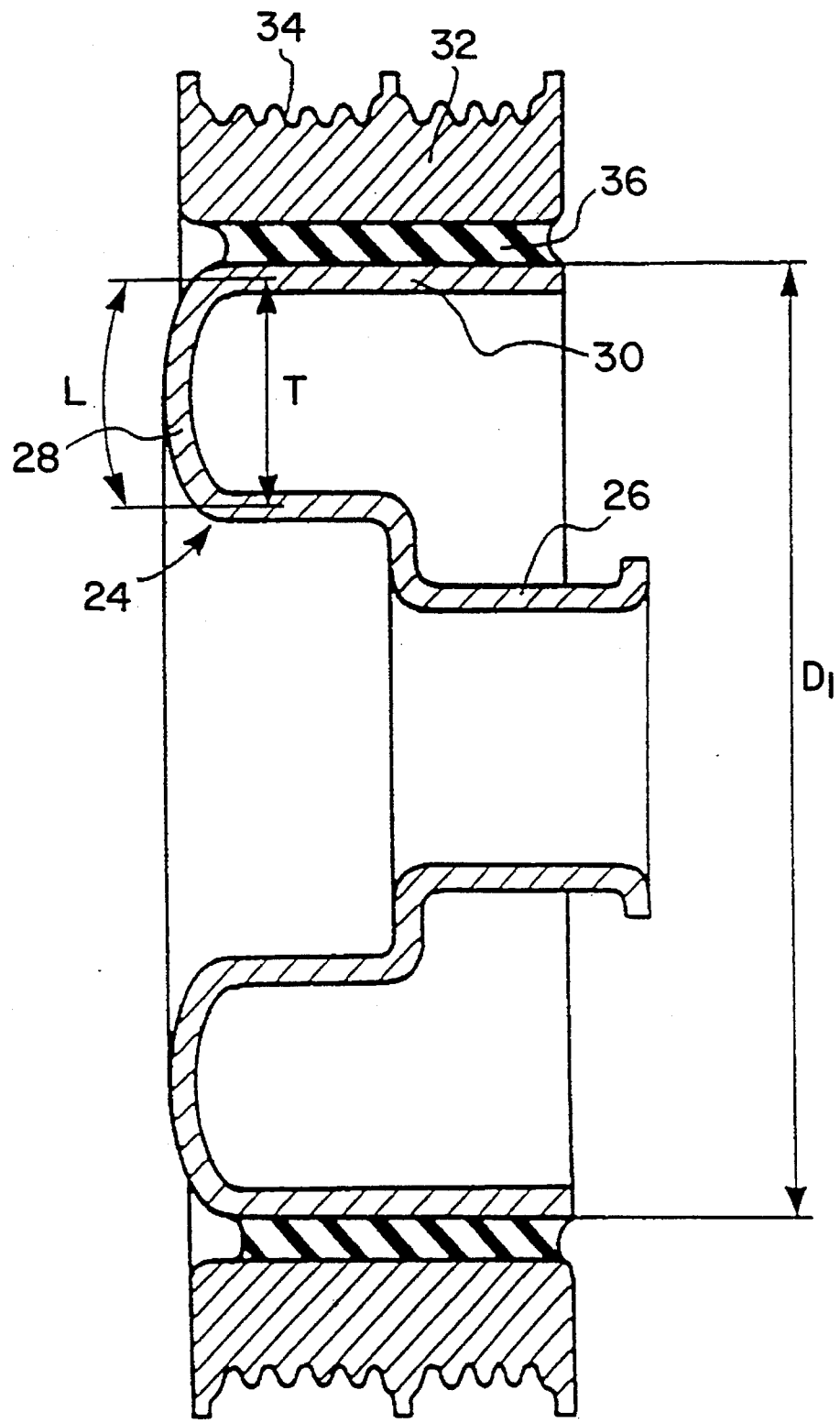
FIG. 2 is a longitudinal sectional view of a damper pulley formed by a first embodiment of a method in accordance with the present invention.

FIG. 2 illustrates a damper pulley formed by a first embodiment of a method in accordance with the present invention, and which is in the state just after the injection-molding of a rubber body is completed. As shown, a pulley 24 is formed by bending a metallic plate, and includes a cylindrical boss portion 26 having a smaller diameter part and a larger diameter part, which is adapted to be press-fitted onto a rotary shaft (not shown), and annular main portion 28 extending radially outwardly from the larger diameter part of the cylindrical boss portion 26, and a flange portion 30 of a predetermined uniform length which bends horizontally from an outer periphery of the main portion 28.

A ring-shaped damper-mass member 32 is disposed outside the flange portion 30, and a plurality of belt retaining grooves 34 are formed along the outer periphery of the damper-mass member 32 by die molding. A rubber body 36 is formed between the flange portion 30 and the damper-mass member 32 over substantially the entire length of the flange portion 30 by injection-molding and bonded thereto by vulcanization. Due to injection-molding, the rubber body 36 shrinks and shrinkage strain occurs therewithin.

The annular main portion 28 curves into an arc-shaped cross-section, and the radial length (L) thereof is made greater than the distance in a straight line (T) between the boss portion 26 and the flange portion 30. In this case, the diameter of the flange portion 30 is designated by D1.

Figure 3:
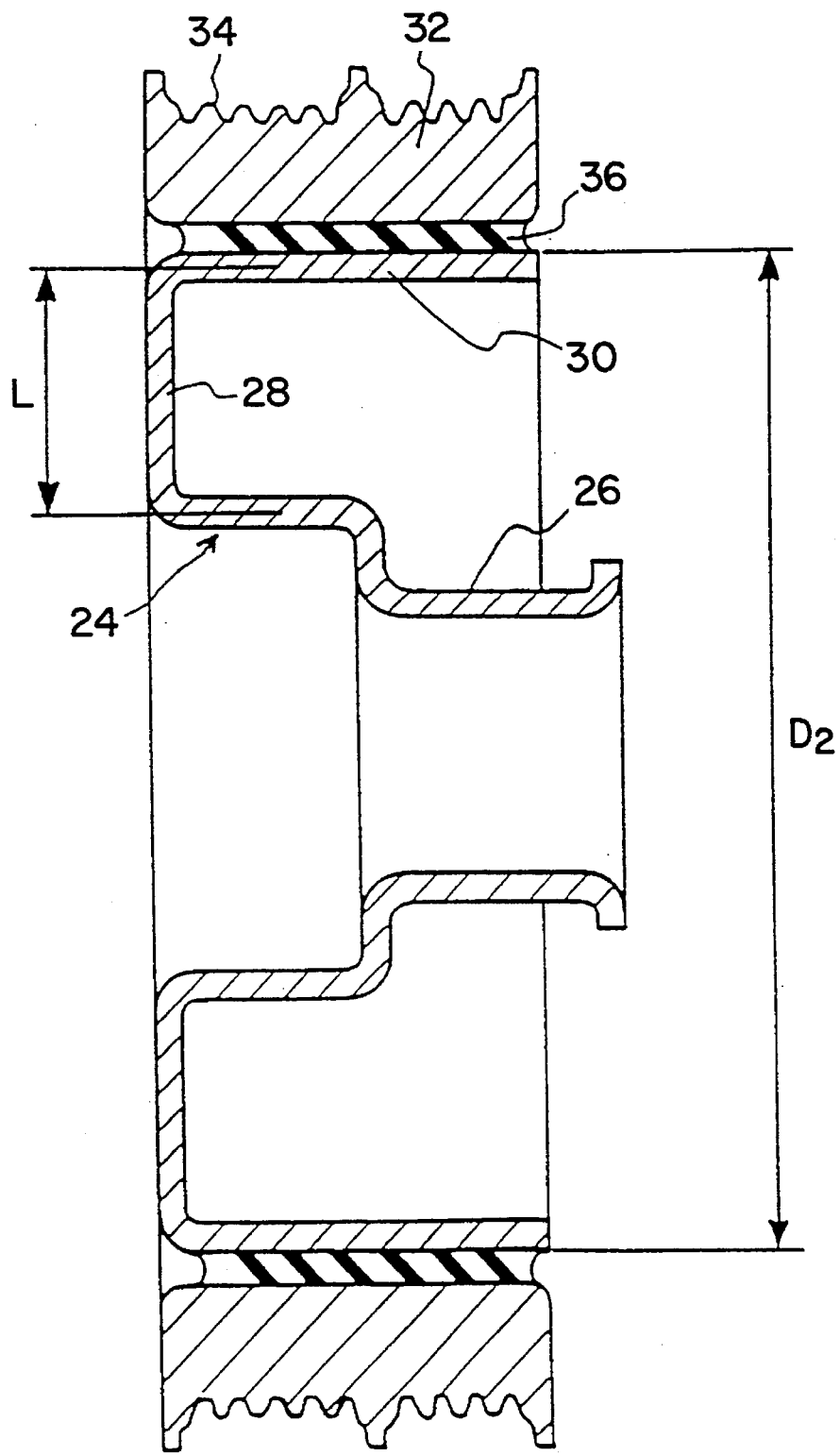
FIG. 3 is a longitudinal sectional view of a finished damper pulley of a first embodiment.

Then, the flange portion 30 is enlarged radially outwardly into a diameter of D2, as shown in FIG. 3, whereby the main portion 28 is deformed and elongated into a straight section from an arc-shaped section, with the radial length (L) unchanged. Due to enlargement of the diameter of the flange portion 30, the distance between the flange portion 30 and the damper-mass member 32 is decreased to compress the rubber body 36 between the flange part 30 and the damper-mass member 32. As a result, shrinkage strain within the rubber body 36 due to injection-molding is eliminated, thereby improving durability of the rubber body 36. In this case, the compressibility of the rubber body 36 is as low as about 10%.

The annular main portion 28 elongates radially outwardly with the enlargement of the flange portion 30. At this time, the configuration of the main portion 28 is changed, but the thickness thereof is not reduced. Accordingly, the strength of the main portion 28 is not reduced.

Furthermore, a large force is not needed to enlarge the flange portion 30, whereby the enlargement of the entire flange portion 30 can be performed with uniformity and ease. This causes the rubber body 36 to be compressed with uniformity and to be firmly fixed to both the flange portion 30 and the damper mass member 32 with residual shrinkage strain eliminated.

Figure 4:
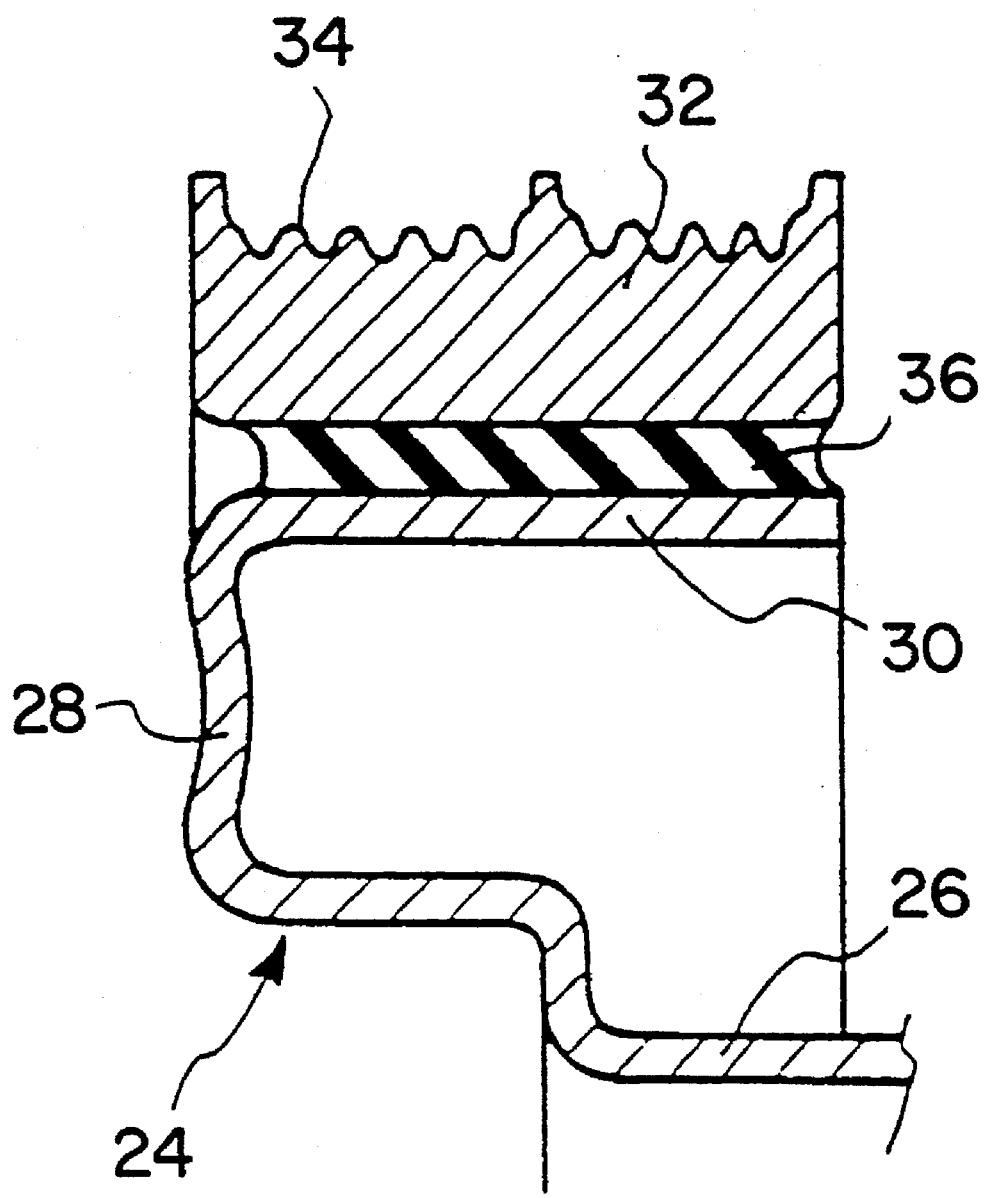
FIG. 4 is a longitudinal sectional view of a main part of a damper pulley formed by a second embodiment of a method in accordance with the present invention.

FIG. 4 illustrates a portion of a damper pulley formed by a second embodiment of a method of the present invention.

The configuration of the annular main portion 28 prior to elongation is not limited to an arc-shaped section; it may have any configuration provided that at least one radial part thereof has a curved section. For example, in the present embodiment, the annular main portion 28 has a generally S-shaped section.

Figure 5:
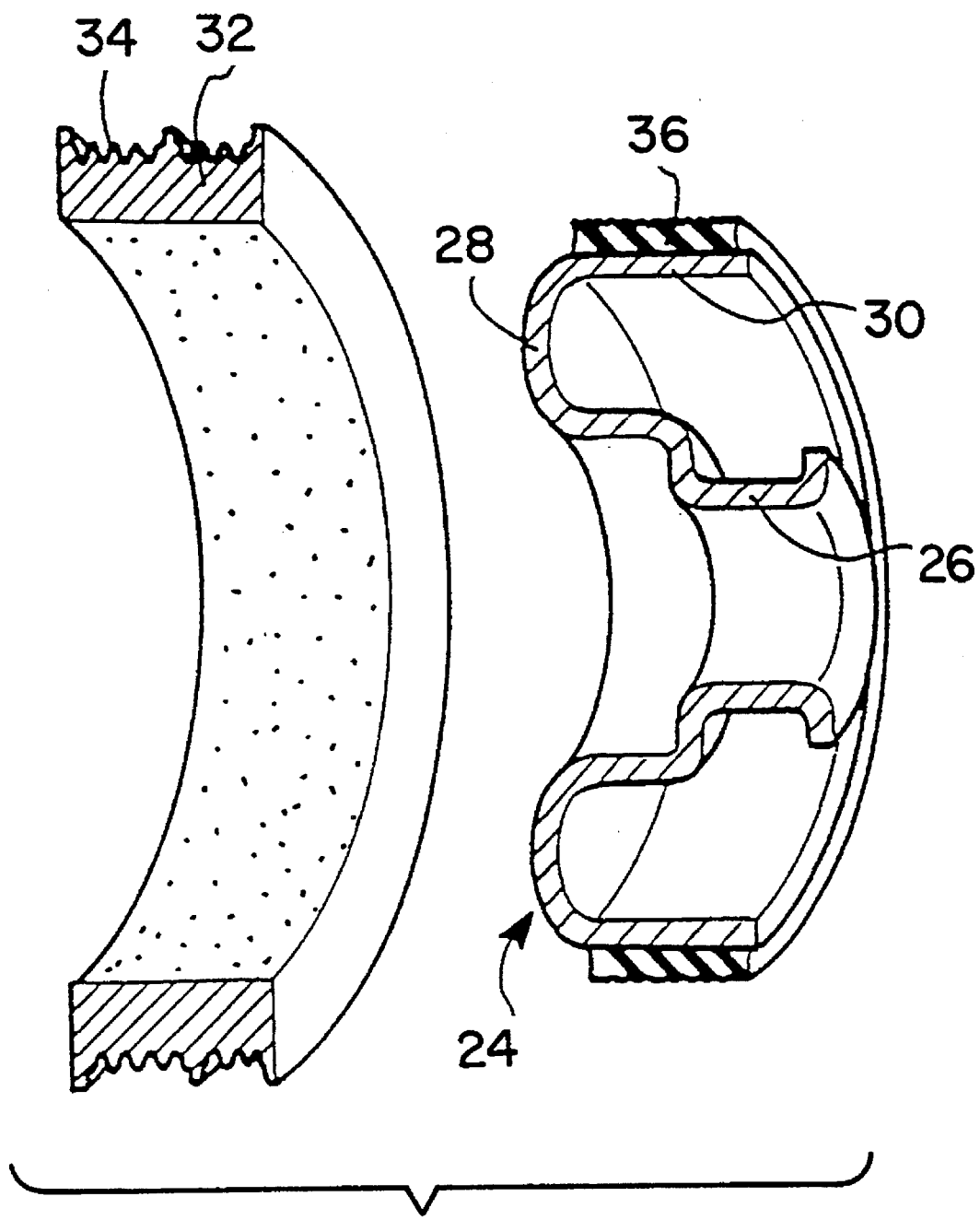
FIG. 5 is a partially cutaway exploded perspective view of a damper pulley formed by a third embodiment of a method in accordance with the present invention.
Figure 6:
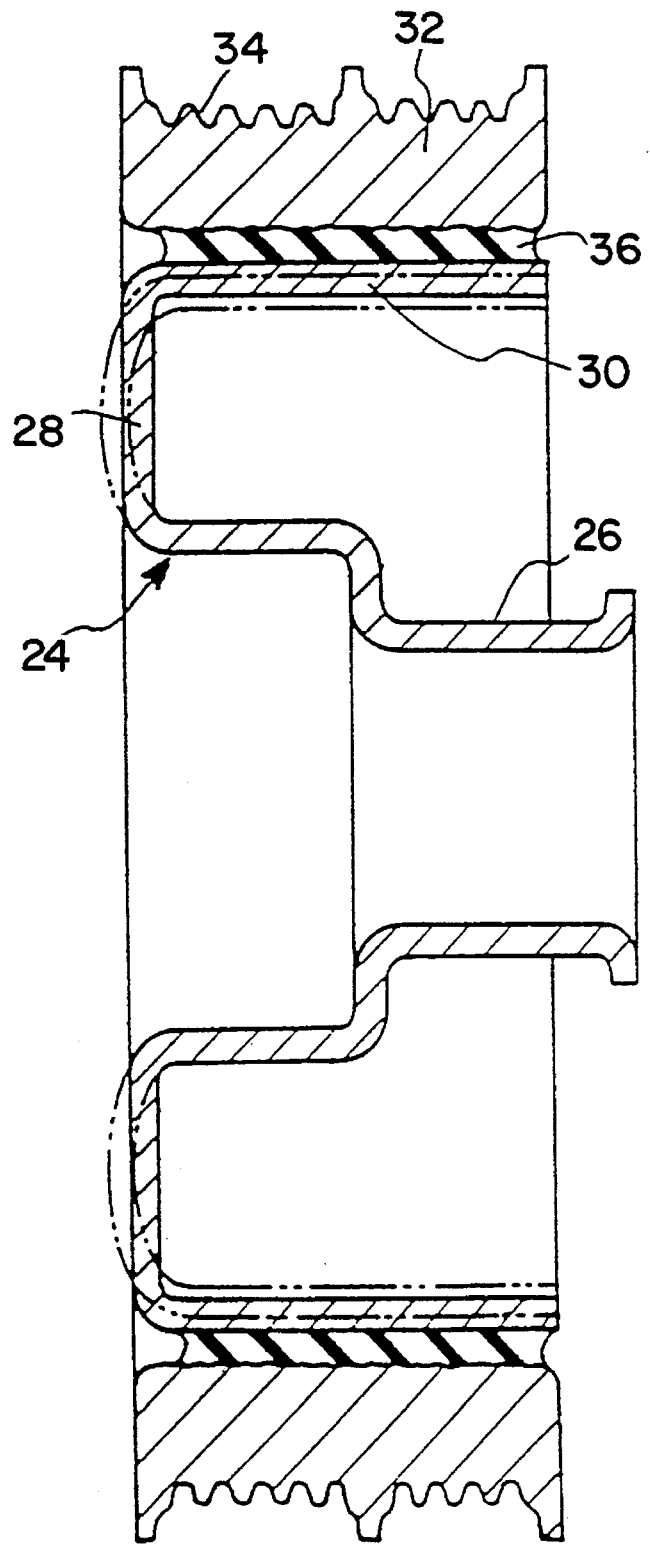
FIG. 6 is a longitudinal sectional view of a finished damper pulley of the third embodiment.

FIGS. 5 and 6 illustrate a damper pulley formed by a third embodiment of a method of the present invention. In FIG. 5, the main portion 28 has an arc-shaped configuration like that of the first embodiment, and the rubber body 36 of a uniform thickness is bonded to an outer surface of the flange portion 30 by vulcanization. The outer surface of the rubber body 36 is made rough by embossing or the like.

The ring-shaped damper-mass member 32 provided with the belt-retaining grooves 34 is formed such that the internal diameter thereof is slightly less than the external diameter of the rubber body 36, and the inner surface of the damper-mass member 32 is made rough by blasting or the like. Then, an adhesive agent is applied to the rough inner surface of the damper-mass member 32, and the pulley 24 is press-fitted onto the damper-mass member 32. At this time, the compressibility of the rubber body 36 ranges from 10 to 15%. Next, as shown in FIG. 6, upon radial enlargement of the flange portion 30, the annular main portion 28 deforms and elongates from an arc-shaped section shown by two-dot chain lines to a straight section shown by solid lines. This causes the rubber body 36 to be compressed further to have compressibility of 20 to 25%. As a result, the rubber body 36 is strongly pressed by the flange portion 30 on the damper-mass member 32, and is prevented from falling off the assembled damper pulley even if large loads are applied to the pulley 24.

Figure 7:
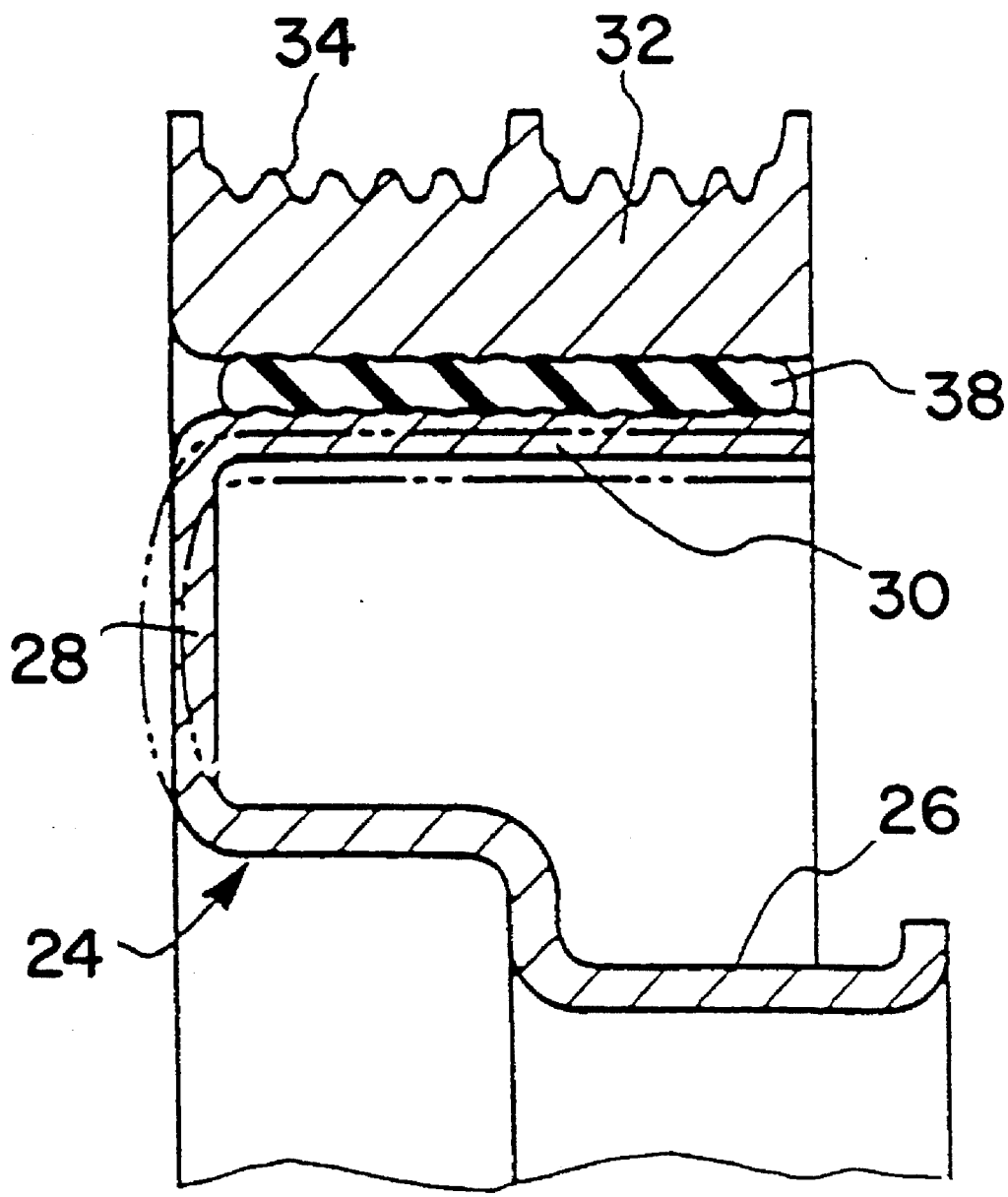
FIG. 7 is a longitudinal sectional view of a main part of a damper pulley formed by a fourth embodiment of a method in accordance with the present invention.

The present invention is also applicable to the damper pulley of which the rubber body is inserted between the flange part and the damper-mass member as well as the damper pulley of which the rubber body is formed by injection molding. In the fourth embodiment shown in FIG. 7, both the outer surface of the flange portion 30 and the inner surface of the damper-mass member 32 facing the outer surface of the flange portion 30 with a predetermined distance are made rough and coated with an adhesive agent. Then, a rubber body 38 is inserted between the flange portion 30 prior to enlargement, which is shown by two-dot chain lines, and the damper-mass member 32. Next, the flange portion 30 is radially enlarged to elongate the main portion 28 to a straight section, whereby the rubber body 38 is strongly pressed by the flange portion 30 on the damper-mass member 32.

With the method of the present invention, the rubber body 38 can be inserted with ease, and can be prevented from falling off the damper pulley with certainty.

The adhesive agent need not necessarily be provided if the rubber body 38 can be prevented from falling off the assembled damper pulley due to the radial enlargement of the flange portion 30.

Figure 8:
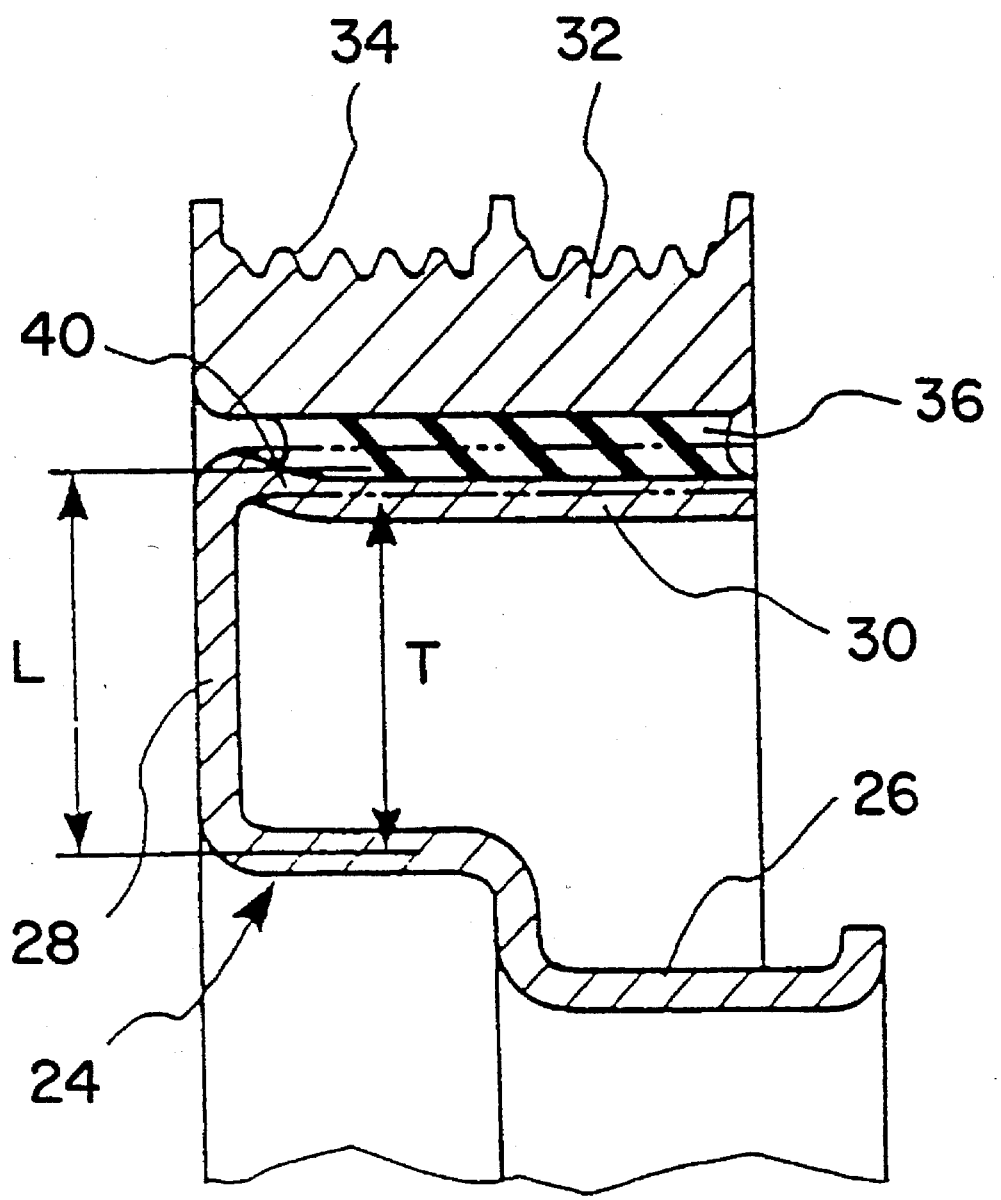
FIG. 8 is a longitudinal sectional view of a main part of a damper pulley formed by a fifth embodiment of a method in accordance with the present invention.

In the fifth embodiment illustrated in FIG. 8, the annular main portion 28 does not have a curved section. Instead, the configuration of the flange portion 30 is changed. Namely, the distance (T) between the flange portion 30 and the larger diameter part of the cylindrical boss portion 26 is made less than the radial length (L) of the main portion 28, and the base end of the flange portion 30 gradually inclines toward the peripheral edge of the main portion 28 and is connected thereto to provide a curved part 40.

Then, a rubber body 36 is injected between the pulley 24 and the damper-mass member 32, and is bonded thereto by vulcanization. Next, the flange portion 30 is radially enlarged, as shown by two-dots chain lines in FIG. 8. This results in the curved part 40 of the flange portion 30 deforming and elongating into a straight section. In the present embodiment, the main portion 28 does not deform, and accordingly, its radial length L is not changed.

As described above, the main portion 28 is not radially elongated so that the thickness thereof is not reduced, thereby maintaining sufficient strength thereof. Furthermore, the curved part 40 facilitates the radial enlargement of the flange portion 30, thereby enabling a uniform radial enlargement of the flange part 30 over the entire portion thereof. As a result, the flange portion 30 can press the rubber body 36 onto the damper-mass member 32 with uniformity.

The configuration of the flange portion 30 shown in the present embodiment can be also applied to the damper pulley of which the rubber body is not formed by injection-molding but inserted between the pulley 24 and the damper-mass member 32.

As described above, with the methods in accordance with the present invention, a lightweight damper pulley provided with an integral cylindrical boss portion can be easily produced while maintaining sufficient strength. Furthermore, the rubber body can be firmly fixed with shrinkage strain thereof eliminated and without generation of gaps, because the flange portion can be radially enlarged with uniformity to press the rubber body on the damper-mass member uniformly. Therefore, the rubber body can be prevented from lowering in adhesive properties, and falling-off the assembled damper pulley, and accordingly, the durability of the rubber body is improved.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for producing a damper pulley having a boss portion constructed and arranged to be press-fitted onto a rotary shaft, an annular main portion extending from said boss portion, a flange portion formed along an outer periphery of said main portion, a ring-shaped damper-mass member located about said flange portion, and a rubber body interposed between said flange portion and said damper-mass member, the method comprising the sequential steps of:

forming said boss portion, said main portion and said flange portion integrally from a metallic plate such that at least one part of said main portion has a curved section and a radial length of said main portion is greater than a straight line distance between said boss portion and said flange portion;

placing said rubber body between said flange portion and said damper-mass member; and enlarging a diameter of said flange portion to elongate said at least one part of said main portion having the curved section, thereby substantially straightening said curved section and pressing said rubber body by the enlarged flange portion.

2. The method according to claim 1, wherein said annular main portion is formed into an arc-shaped section.

3. The method according to claim 1, wherein said annular main portion is formed into a generally S-shaped section.

4. The method according to claim 1, wherein said rubber body is bonded to an outer surface of said flange portion and is press-fitted onto an inner surface of said damper-mass member.

5. A method for producing a damper pulley having a boss portion constructed and arranged to be press-fitted onto a rotary shaft, an annual main portion extending from said boss portion, a flange portion formed along an outer periphery of said main portion, a ring-shaped damper-mass member disposed about said flange portion, and a rubber body interposed between said flange portion and said damper-mass member, the method comprising the sequential steps of:

forming said boss portion, said main portion and said flange portion integrally from a metallic plate such that said flange portion has a curved part at the base end connected to a peripheral edge of said annular main portion and a radial distance between said flange portion and said boss portion is less than a radial length of said main portion;

placing said rubber body between said flange portion and said damper-mass member; and enlarging a diameter of said flange portion to elongate and substantially straighten said curved part of said flange portion, thereby pressing said rubber body by the enlarged flange portion.

6. The method according to claim 5, wherein said rubber body is bonded to an outer surface of said flange portion and is press-fitted onto an inner surface of said damper-mass member.

* * * * *